(12) United States Patent
Mendiola

(10) Patent No.: US 8,128,490 B2
(45) Date of Patent: Mar. 6, 2012

(54) SYSTEM AND METHOD OF ESTABLISHING AND OPERATING A PARIMUTUEL FUND

(75) Inventor: Dennis Mendiola, New York, NY (US)

(73) Assignee: VOXP Pte. Ltd., Singapore (SG)

( * ) Notice: Subject to any disclaimer, the term of this patent is extended or adjusted under 35 U.S.C. 154(b) by 103 days.

(21) Appl. No.: 12/446,750

(22) PCT Filed: Aug. 12, 2008

(86) PCT No.: PCT/SG2008/000298
§ 371 (c)(1),
(2), (4) Date: Dec. 28, 2009

(87) PCT Pub. No.: WO2009/022992
PCT Pub. Date: Feb. 19, 2009

(65) Prior Publication Data
US 2011/0165935 A1    Jul. 7, 2011

Related U.S. Application Data

(60) Provisional application No. 60/964,852, filed on Aug. 15, 2007.

(51) Int. Cl.
*G06F 17/00* (2006.01)
(52) U.S. Cl. ......................................................... 463/25
(58) Field of Classification Search .............. 463/16–28, 463/40–42
See application file for complete search history.

(56) References Cited

U.S. PATENT DOCUMENTS

| | | | | |
|---|---|---|---|---|
| 5,909,875 | A * | 6/1999 | Weingardt ..................... | 273/269 |
| 6,527,270 | B2 * | 3/2003 | Maksymec et al. ........ | 273/138.1 |
| 6,910,965 | B2 * | 6/2005 | Downes ........................... | 463/28 |
| 7,094,151 | B2 * | 8/2006 | Downes ........................... | 463/28 |
| 7,775,880 | B2 * | 8/2010 | Downes ........................... | 463/28 |

OTHER PUBLICATIONS

WIPO, Written Opinion of the International Search Authority for International Application No. PCT/SG2008/000298.

\* cited by examiner

*Primary Examiner* — Ronald Laneau
(74) *Attorney, Agent, or Firm* — Intellectual Property Law Group LLP

(57) ABSTRACT

In one aspect of the invention there is a system for establishing a parimutuel fund (30) comprising a first mobile phone (14) and a second mobile phone (18) and a parimutuel administrator (22). Each mobile phone (14, 18) has an associated credit balance (16, 20). In this manner, a person (26) in possession of the first mobile phone (14) instructs the parimutuel administrator (22) to transfer a first predetermined amount from their credit balance (16) associated with the first mobile phone (14) to the credit balance (20) associated with the second mobile phone (18) and to contribute a second predetermined amount to a parimutuel fund (30), the person (26) further operable to indicate to the parimutuel administrator (22) the selected outcome of the event associated with the parimutuel fund (30) such that, if the outcome of the event associated with the parimutuel fund (30) is the same as the selected outcome, the parimutuel administrator (22) is operable to credit the credit balance (16) associated with the first mobile phone (14) with an amount equal to the total of the parimutuel fund (30) divided by the total amount of contributions made in respect of the selected outcome then multiplied by the second predetermined amount.

6 Claims, 1 Drawing Sheet

SYSTEM AND METHOD OF ESTABLISHING AND OPERATING A PARIMUTUEL FUND

FIELD OF THE INVENTION

The invention relates to a system and method of establishing and operating a parimutuel fund. The method is particularly focused on providing a parimutuel fund based on mobile phone credit.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Parimutuel events have always draw a huge following both for the purpose of leisure as well as for wagering. In its earliest forms, participating in parimutuel events required physical presence for the participant not only to experience the event itself, but also to be able to physically hand in his or her contribution to the parimutuel fund.

Advances in technology have now allowed participants to view the event from a remote location and provide his or her contribution to the parimutuel fund through "off-track" wagering facilities or by the phone or Internet.

The problem with such systems is that each requires the use of an electronic banking facility. In developing countries, however, such advanced electronic banking facilities are either not available or not available to the general public.

It is an object of the invention to provide a method of establishing and operating a parimutuel fund that does not rely on participants requiring access to advanced banking facilities.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is a system for establishing a parimutuel fund comprising:
 a first mobile phone having an associated credit balance and a second credit balance;
 a parimutuel administrator
where, a person in possession of the first mobile phone instructs the parimutuel administrator to transfer a first predetermined amount from their credit balance associated with the first mobile phone to the second credit balance and to contribute a second predetermined amount to a parimutuel fund, the person further operable to indicate to the parimutuel administrator the selected outcome of the event associated with the parimutuel fund such that, if the outcome of the event associated with the parimutuel fund is the same as the selected outcome, the parimutuel administrator is operable to credit the credit balance associated with the first mobile phone with an amount equal to the total of the parimutuel fund divided by the total amount of contributions made in respect of the selected outcome then multiplied by the second predetermined amount.

The second credit balance may be associated with a mobile phone in the possession of a second person. Alternatively, the second credit balance is associated with a merchant and the amount transferred to the second credit balance is equal to the cost of a specified good or service.

In accordance with a second aspect of the invention there is a system for establishing a parimutuel fund comprising:
 a first mobile phone having an associated credit balance and a second credit balance
 a parimutuel administrator
where, a person in possession of the first mobile phone instructs the parimutuel administrator to transfer a first predetermined amount from their credit balance associated with the first mobile phone to the second credit balance and to contribute a second predetermined amount to a parimutuel fund, the person further operable to indicate to the parimutuel administrator the selected outcome of the event associated with the parimutuel fund such that, if the outcome of the event associated with the parimutuel fund is the same as the selected outcome, the parimutuel administrator is operable to credit the second credit balance with an amount equal to the total of the parimutuel fund divided by the total amount of contributions made in respect of the selected outcome then multiplied by the second predetermined amount.

Again, the second credit balance may be associated with a mobile phone in the possession of a second person. Alternatively, the second credit balance is associated with a merchant and the amount transferred to the second credit balance is equal to the cost of a specified good or service.

Other aspects of the invention are directed to a parimutuel administrator operable in the context of the systems described in the first and second aspects of the invention, computer software to carry out the system as described in the first and second aspects of the invention and methods for establishing and operating a parimutuel fund substantially as described in the first and second aspects of the invention.

BRIEF DESCRIPTION OF THE DRAWINGS

The invention will now be described, by way of example only, with reference to the accompanying drawings, in which.

PREFERRED EMBODIMENTS OF THE INVENTION

Figure 1:
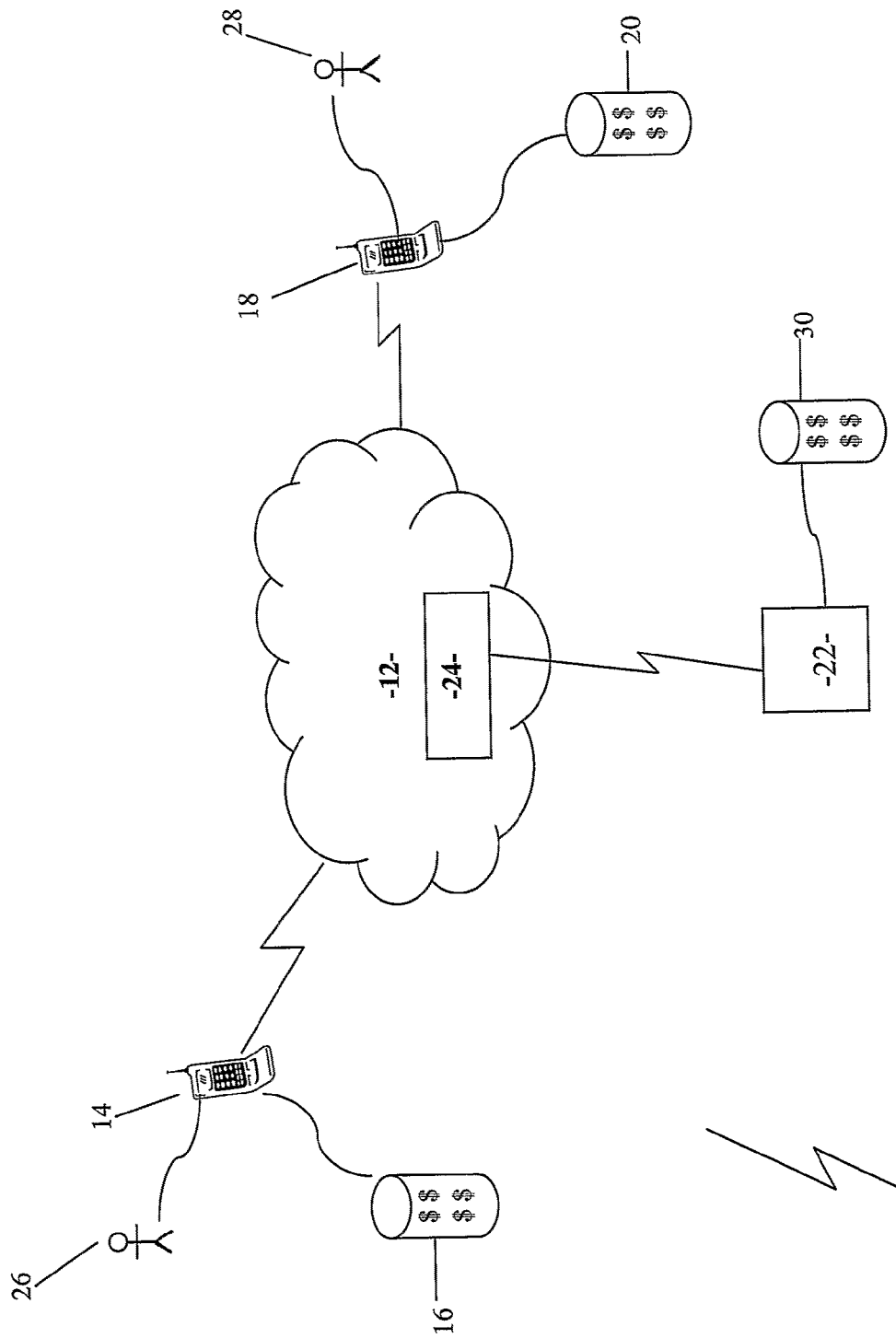
FIG. 1 is a schematic of a system for establishing and operating a parimutuel fund in accordance with the present invention.

Specific embodiments of the present invention are now described in detail. The terminology used herein is for the purpose of describing particular embodiments only, and is not intended to limit the scope of the present invention.

In accordance with a first embodiment of the invention there is system and method for establishing and operating a parimutuel fund 10 over at least one telecommunications network 12 comprising:
 a first mobile phone 14 having an associated credit balance 16;
 a second mobile phone 18 having an associated credit balance 20; and
 a parimutuel administrator 22.

In this embodiment, the first mobile phone 14 and second mobile phone 18 are connected to the same telecommunications network 12. An operator 24 of the telecommunications network 12 tracks and stores details of the associated credit balances 16, 20 of each mobile phone 14, 18.

The parimutuel administrator 22 is in communication with the operator 24 so as to provide requests for services to the operator 24 as and when required.

The invention will now be described in the context of its intended use.

A person 26 in possession of the first mobile phone 14 calls a first number associated with the parimutuel administrator 22. On connection, the person is asked to provide the following details by appropriate use of their mobile phone 14:

The amount of their credit balance 16 that they wish to transfer to a second person 28;

The amount of their credit balance 16 that they wish to transfer to a parimutuel fund 30.

The outcome of an event associated with the parimutuel fund 30 that they wish to place the amount on.

Details of the mobile phone associated with the second person 28 to whom a credit is to be transferred.

In this example, the second person 28 is a person in possession of the second mobile phone 18 and the associated mobile phone is second mobile phone 18.

Upon entering the above information, the parimutuel administrator 22 operates to send commands to the operator 24 to debit credit balance 16 by the sum total of the amount to be transferred to the second person 28 plus the amount to be transferred to the parimutuel fund 30 and a service fee. At the same time, commands are sent to the operator 24 to:

credit the credit balance 20 by the amount of the credit balance the person 26 has indicated they wish to transfer to the second person 28; and credit a credit balance of the parimutuel administrator 22 with the sum total of the amount to be transferred to the parimutuel fund 30 and the service fee.

Once the credit balance of the parimutuel administrator 22 has been so credited, the parimutuel administrator 22 increases the balance of the nominated parimutuel fund 30 by the amount the person 26 has indicated that they wish to transfer to the parimutuel fund 30. A record of the person 26, the nominated outcome and the amount transferred to the parimutuel fund 30 is also associated therewith to facilitate the possibility of later payment.

The parimutuel administrator 22 thereafter monitors an event and in particular the outcome related to each parimutuel fund 30. On determination of the event, the parimutuel administrator 22 checks all recorded transactions to create a list of those records related to the event outcome. The amount of the parimutuel fund 30 is divided by the sum of the amounts transferred to the parimutuel fund 30 by those persons recorded on the list In this manner a winning per unit amount is calculated.

For each person on the list, the parimutuel administrator 22 works out the amount to be credited to their credit balance by multiplying the amount transferred to the parimutuel fund 30 by the winning per unit amount. Once so calculated, the parimutuel administrator 22 operates to send commands to the operator 24 to debit the parimutuel administrator's 22 credit balance by the determined amount and credit the winning person's credit balance by the same amount.

In accordance with a second embodiment of the invention, where like numerals reference like parts, there is a system and method for establishing an operating a parimutuel fund over at least one telecommunications network 12.

As with the first embodiment, the first mobile phone 14 has an associated credit balance 16. However, in this embodiment there is no second mobile phone 22. Rather there is a merchant (not shown) having an associated credit balance with the telecommunications network 12 to which the first mobile phone 14 connects. The operator 24 of the telecommunications network 12 tracks and stores details of the associated credit balances 16, 20 of the first mobile phone 14 and the merchant's credit balance.

The parimutuel administrator 22 is in communication with the operator 24 so as to provide requests for services to the operator 24 as and when required.

The invention will now be described in the context of its intended use.

A person 26 in possession of the first mobile phone 14 calls a first number associated with the parimutuel administrator 22. On connection, the person is asked to provide the following details by appropriate use of their mobile phone 14:

An identifier for the merchant who is to receive payment

The good or service they wish to purchase from the merchant;

The amount of their credit balance 16 that they wish to transfer to a parimutuel fund 30.

The outcome of an event associated with the parimutuel fund 30 that they wish to place the amount on.

In this example, details of merchants are already recorded for reference by the parimutuel administrator. Such details include sufficient information to reference the merchant's credit balance with the operator 24. The details also include the goods/services offered by that merchant and the prices of such goods/services.

Upon entering the above information, the parimutuel administrator 22 operates to send commands to the operator 24 to debit credit balance 16 by the sum total of the amount to be transferred to the merchant's credit balance in payment for the good/service plus the amount to be transferred to the parimutuel fund 30 and a service fee. At the same time, commands are sent to the operator 24 to:

credit the merchant's credit balance by the amount equal to the price of the good/service purchased; and credit a credit balance of the parimutuel administrator 22 with the sum total of the amount to be transferred to the parimutuel fund 30 and the service fee.

Once the credit balance of the parimutuel administrator 22 has been so credited, the parimutuel administrator 22 increases the balance of the nominated parimutuel fund 30 by the amount the person 26 has indicated that they wish to transfer to the parimutuel fund 30. A record of the person 26, the nominated outcome and the amount transferred to the parimutuel fund 30 is also associated therewith to facilitate the possibility of later payment.

The parimutuel administrator 22 thereafter monitors an event and in particular the outcome related to each parimutuel fund 30. On determination of the event, the parimutuel administrator 22 checks all recorded transactions to create a list of those records related to the event outcome. The amount of the parimutuel fund 30 is divided by the sum of the amounts transferred to the parimutuel fund 30 by those persons recorded on the list In this manner a winning per unit amount is calculated.

For each person on the list, the parimutuel administrator 22 works out the amount to be credited to their credit balance by multiplying the amount transferred to the parimutuel fund 30 by the winning per unit amount. Once so calculated, the parimutuel administrator 22 operates to send commands to the operator 24 to debit the parimutuel administrator's 22 credit balance by the determined amount and credit the winning person's credit balance by the same amount.

It should be appreciated by the person skilled in the art that the above invention is not limited to the embodiment described. In particular, the following modifications and improvements may be made without departing from the scope of the present invention:

The parimutuel administrator 22 may be a computer program or individual. Ideally, it is a part of an organisation that acts as operator 24.

The parimutuel administrator 22 may operate to provide notification to the party contributing to the parimutuel fund 30 of their contribution. For example, by way of a Short Messaging Service ("SMS") message or e-mail. Similarly, the parimutuel administrator 22 may operate to provide notification of the outcome of the event associated with the parimutuel fund 30 and details of whether the party has won or not based on their contribution.

The first and second mobile phones 14, 16 may operate on different telecommunications networks 12. In this instance, the parimutuel administrator 22 must be in communication with the operator of each such telecommunications network 12.

The number associated with the parimutuel administrator 22 may be a shortcode with suffixed numerals used to provide details of the second person 28 to whom a credit balance should be transferred (ie. their phone number) or the outcome of an event.

Communication between the person 26 and the parimutuel administrator may be by way of personal voice interaction, interactive voice menu or messaging systems (such as Short Messaging Systems).

The person 26 may only select one amount to be transferred and specify a percentage split indicative of the amount to be transferred to the second person 28 and the amount to be contributed to the parimutuel fund 30.

The person 26 may be determined by automated techniques as would be known to the person skilled in the art.

The amount to be transferred to the second person 28 and the amount to be contributed to the parimutuel fund 30 may be set amounts.

The event associated with the parimutuel fund 30 may be a random event or a real-world event. In either situation, the event should be time-limited in some manner.

The second person 28 may be able to be identified by the first person with reference to a "buddy list" maintained by the parimutuel administrator 22 or by reference to a list of past transfers.

The contribution made by the person 26 may be recorded by the parimutuel administrator 22 as having been made by the second person 28 in a further variation of the invention. In this manner, the person 26 can gift their contribution to the parimutuel fund to the benefit of the second person 28.

Processing of the system is not restricted to the description mentioned above. Instead, it is possible to determine a winning per-unit value for each of the outcomes as and when a contribution is made to the parimutuel fund 30.

The parimutuel administrator 22 may be further adapted to allow a person to establish a parimutuel fund 30 to be subsequently administered by the parimutuel administrator 22 in accordance with the above description of the invention. In this respect, the minimum that such person needs to provide to the parimutuel administrator 22 is details of the event to be associated with the parimutuel fund 30 and the possible outcomes of such event. From this information, the person skilled in the art can appropriately derive the processing required to implement such a function. Further information as may be provided by the party to establish the parimutuel fund 30 may include minimum contribution levels, last time before event likely to conclude when contributions may be made and details of parties who may (or may not) be able to contribute to the parimutuel fund 30.

The person 26 and the second person 28 may be one and the same, with the transfer being a transfer of credit between mobile phones in that person's possession.

As indicated in the second embodiment, the destination account need not be associated with a mobile phone, but must be an account to which mobile phone credit can be transferred.

The parimutuel administrator may be automatically set up to identify the price or a good/service offered by a merchant on identification of said good/service. Alternatively, the first person may manually enter the price of the good/service by without need to identify the good/service so purchased.

The merchant may be in possession of a mobile phone and the second credit balance may be associated with that mobile phone. In this situation, identification of the merchant may be by way of the merchant's mobile phone number.

Furthermore, the features described in the above embodiments and the additional features mentioned above may be combined to form yet additional embodiments that fall within the scope of the present invention.

I claim:

1. A system for establishing a parimutuel fund having a memory and a computer program stored in the memory, the system comprising:

a first mobile phone in communication with a telecommunications network, having an associated credit balance and a second credit balance;

a parimutuel administrator operated by the system and in communication with the first mobile phone through the telecommunications network where, a person in possession of the first mobile phone instructs the parimutuel administrator which is operable to transfer a first predetermined amount from their credit balance associated with the first mobile phone to the second credit balance and to contribute a second predetermined amount to a parimutuel fund, the person further operable to indicate to the parimutuel administrator a selected outcome of an event associated with the parimutuel fund such that, if an outcome of the event associated with the parimutuel fund is the same as the selected outcome, the parimutuel administrator is operable to credit the credit balance associated with the first mobile phone with an amount equal to the total of the parimutuel fund divided by the total amount of contributions made in respect of the selected outcome then multiplied by the second predetermined amount.

2. A system according to claim 1, where the second credit balance is associated with a mobile phone in the possession of a second person.

3. A system according to claim 1, where the second credit balance is associated with a merchant and the amount transferred to the second credit balance is equal to the cost of a specified good or service.

4. A system for establishing a parimutuel fund having a memory and a computer program stored in the memory, the system comprising:

a first mobile phone in communication with a telecommunications network, having an associated credit balance and a second credit balance;

a parimutuel administrator operated by the system and in communication with the first mobile phone through the telecommunications network where, a person in possession of the first mobile phone instructs the parimutuel administrator which is operable to transfer a first predetermined amount from their credit balance associated with the first mobile phone to the second credit balance and to contribute a second predetermined amount to a parimutuel fund, the person further operable to indicate to the parimutuel administrator a selected outcome of an event associated with the parimutuel fund such that, if an outcome of the event associated with the parimutuel fund is the same as the selected outcome, the parimutuel administrator is operable to credit the second credit balance with an amount equal to the total of the parimutuel fund divided by the total amount of contributions made in respect of the selected outcome then multiplied by the second predetermined amount.

5. A system according to claim 4, where the second credit balance is associated with a mobile phone in the possession of a second person.

6. A system according to claim 4, where the second credit balance is associated with a merchant and the amount transferred to the second credit balance is equal to the cost of a specified good or service.

* * * * *